US012098515B2

(12) United States Patent
Konda et al.

(10) Patent No.: US 12,098,515 B2
(45) Date of Patent: Sep. 24, 2024

(54) WORK MACHINE AND METHOD FOR CONTROLLING THE SAME

(71) Applicant: KOMATSU LTD., Tokyo (JP)

(72) Inventors: Tomoki Konda, Tokyo (JP); Takeshi Oi, Tokyo (JP); Kenjiro Shimada, Tokyo (JP); Kenji Ohiwa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 471 days.

(21) Appl. No.: 17/618,954

(22) PCT Filed: Jun. 30, 2020

(86) PCT No.: PCT/JP2020/025654
§ 371 (c)(1),
(2) Date: Dec. 14, 2021

(87) PCT Pub. No.: WO2021/014900
PCT Pub. Date: Jan. 28, 2021

(65) Prior Publication Data
US 2022/0316174 A1 Oct. 6, 2022

(30) Foreign Application Priority Data
Jul. 19, 2019 (JP) ................................ 2019-134035

(51) Int. Cl.
*E02F 3/43* (2006.01)
*E02F 3/32* (2006.01)
(Continued)

(52) U.S. Cl.
CPC ................ *E02F 3/435* (2013.01); *E02F 3/32* (2013.01); *E02F 3/425* (2013.01); *E02F 9/2203* (2013.01);
(Continued)

(58) Field of Classification Search
CPC ... E02F 3/435; E02F 3/32; E02F 3/425; E02F 9/2203; E02F 9/2228; E02F 9/2246;
(Continued)

(56) References Cited

U.S. PATENT DOCUMENTS

2013/0125539 A1 5/2013 Kobayashi et al.
2013/0259620 A1 10/2013 Shirao
(Continued)

FOREIGN PATENT DOCUMENTS

CN 101761105 A 6/2010
CN 102947599 A 2/2013
(Continued)

*Primary Examiner* — Michael V Kerrigan
(74) *Attorney, Agent, or Firm* — Faegre Drinker Biddle & Reath LLP

(57) ABSTRACT

A work machine comprises: a work implement; a hydraulic cylinder; a hydraulic pump that supplies the hydraulic oil to the hydraulic cylinder via a hydraulic circuit; a relief valve that can set a relief pressure of the hydraulic circuit to either a first set pressure or a second set pressure higher than the first set pressure; a detection unit that detects at least one of a pressure of the hydraulic oil in the hydraulic circuit and a speed of the work implement; and a relief pressure changing unit that changes a relief pressure of the relief valve from the first set pressure to the second set pressure based on a detection value of at least one of the pressure of the hydraulic oil in the hydraulic circuit and the speed of the work implement when the controlled state of the work implement is the excavation state.

13 Claims, 5 Drawing Sheets

(51) Int. Cl.

| | |
|---|---|
| ***E02F 3/42*** | (2006.01) |
| ***E02F 9/22*** | (2006.01) |
| ***E02F 9/26*** | (2006.01) |
| ***F15B 13/02*** | (2006.01) |
| ***F15B 19/00*** | (2006.01) |

(52) U.S. Cl.
CPC .......... *E02F 9/2228* (2013.01); *E02F 9/2246* (2013.01); *E02F 9/2267* (2013.01); *E02F 9/26* (2013.01); *F15B 13/024* (2013.01); *F15B 19/00* (2013.01); *E02F 9/2285* (2013.01)

(58) Field of Classification Search
CPC ......... E02F 9/2267; E02F 9/26; E02F 9/2285; E02F 9/265; E02F 3/437; E02F 3/42; E02F 9/2025; E02F 9/2289; F15B 13/024; F15B 19/00; F15B 11/165; F15B 2211/50536; F15B 2211/526; F15B 2211/6313; F15B 2211/6336; F15B 2211/6651; F15B 2211/6653; F15B 11/04; F15B 2211/20523; F15B 2211/75
See application file for complete search history.

(56) References Cited

U.S. PATENT DOCUMENTS

| | | | | |
|---|---|---|---|---|
| 2018/0030691 | A1 | 2/2018 | Ohigashi et al. | |
| 2021/0301502 | A1 * | 9/2021 | Udagawa ................ | F15B 15/18 |

FOREIGN PATENT DOCUMENTS

| | | | |
|---|---|---|---|
| CN | 103597256 | A | 2/2014 |
| JP | H11-036376 | A | 2/1999 |
| JP | H11-247233 | A | 9/1999 |
| JP | H11336585 | A | 12/1999 |
| JP | 2004-190749 | A | 7/2004 |
| JP | 3779488 | B2 | 5/2006 |
| JP | 2010-156134 | A | 7/2010 |
| JP | 2011-157789 | A | 8/2011 |
| JP | 2012-086617 | A | 5/2012 |
| JP | 2018-145685 | A | 9/2018 |
| WO | WO-2017/138070 | A1 | 8/2017 |

* cited by examiner

WORK MACHINE AND METHOD FOR CONTROLLING THE SAME

TECHNICAL FIELD

The present disclosure relates to controlling excavation by a work machine.

BACKGROUND ART

A work vehicle such as a hydraulic excavator has conventionally been known. For example, International Publication No. WO 2017/138070 (PTL 1) discloses a configuration in which hydraulic oil from a hydraulic pump is supplied via a hydraulic circuit to a control valve for driving a boom, a dipper stick, and a bucket to operate the boom, the dipper stick, and the bucket.

In this respect, the hydraulic excavator of the PTL 1 is provided with a function to change relief pressure of a relief valve of the hydraulic circuit to increase power.

CITATION LIST

Patent Literature

PTL 1: WO 2017/138070

SUMMARY OF INVENTION

Technical Problem

The hydraulic excavator of PTL 1 has the function to increase power when it hoists and swings, rather than to increase power while excavation with a high excavation load is controlled. As a result, excavation may not normally controlled.

An object of the present disclosure is to provide a work machine capable of increasing power when excavation with a high excavation load is controlled, and a method for controlling the work machine.

Solution To Problem

A work machine according to an aspect of the present disclosure comprises a work implement; a hydraulic cylinder that operates the work implement by hydraulic oil; a hydraulic pump that supplies the hydraulic oil to the hydraulic cylinder via a hydraulic circuit; a relief valve that can set a relief pressure of the hydraulic circuit to either a first set pressure or a second set pressure higher than the first set pressure; a state determination unit that determines whether a controlled state of the work implement is an excavation state; a detection unit that detects at least one of a pressure of the hydraulic oil in the hydraulic circuit and a speed of the work implement; and a relief pressure changing unit that changes a relief pressure of the relief valve from the first set pressure to the second set pressure based on a detection value of at least one of the pressure of the hydraulic oil in the hydraulic circuit and the speed of the work implement when the controlled state of the work implement is the excavation state.

A method for controlling a work machine according to an aspect of the present disclosure comprises: determining whether a controlled state of a work implement is an excavation state; detecting at least one of a pressure of hydraulic oil supplied via a hydraulic circuit to a hydraulic cylinder causing the work implement to operate and a speed of the work implement when the controlled state of the work implement is the excavation state; and changing a relief pressure of a relief valve of the hydraulic circuit from a first set pressure to a second set pressure higher than the first set pressure based on a detection value of at least one of the pressure of the hydraulic oil in the hydraulic circuit and the speed of the work implement.

Advantageous Effects Of Invention

The presently disclosed work machine and method for controlling the work machine can increase power when excavation with a high excavation load is controlled.

DESCRIPTION OF EMBODIMENTS

Hereinafter, an embodiment will be described with reference to the drawings. In the following description, identical components are identically denoted. Their names and functions are also identical. Accordingly, they will not be described repeatedly in detail.

<Overall Configuration of Work Machine>

Figure 1:
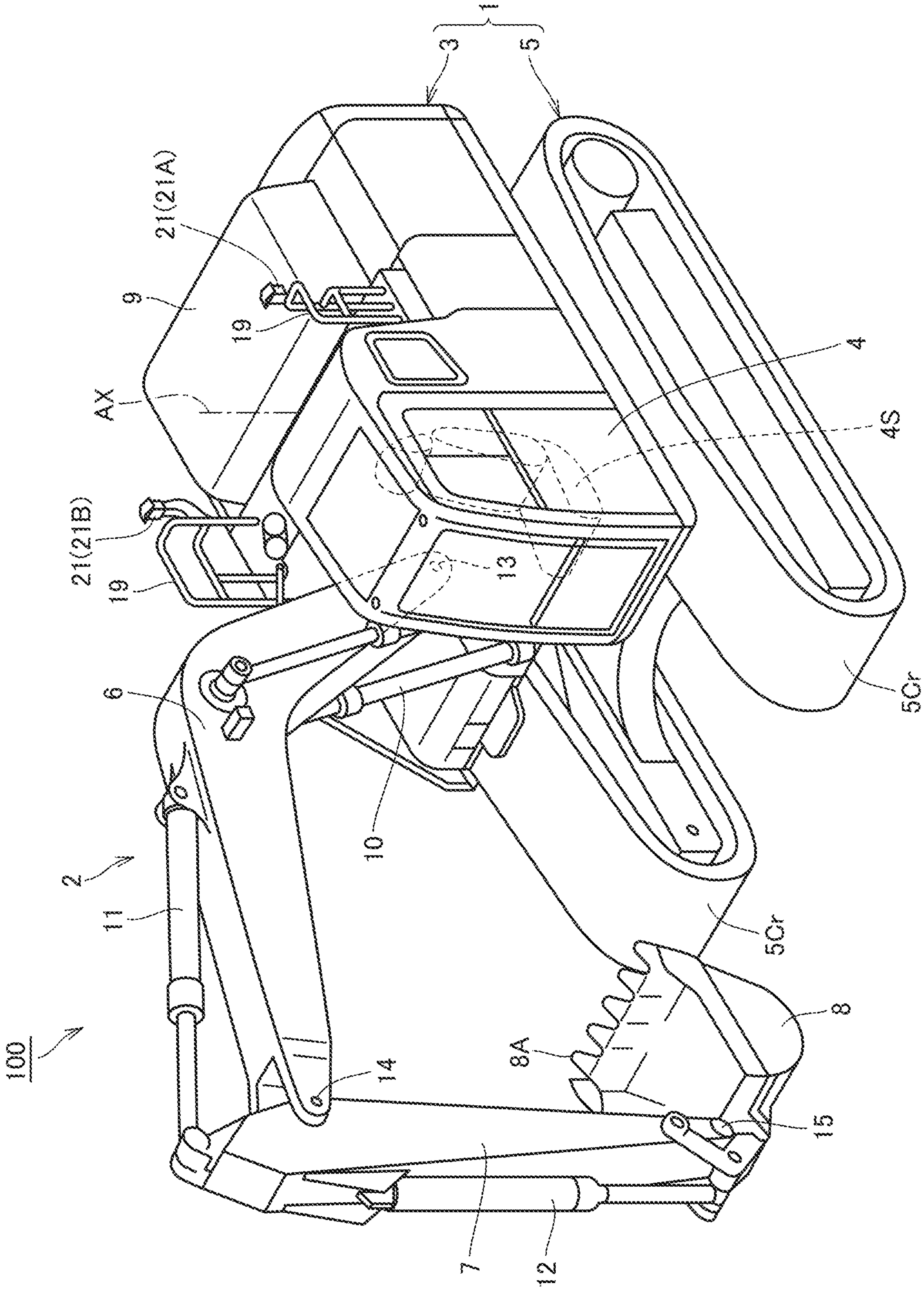
FIG. 1 is an external view of a work machine 100 according to an embodiment.

FIG. 1 is an external view of a work machine 100 according to an embodiment.

As shown in FIG. 1, a hydraulic excavator comprising a hydraulic work implement 2 will be described as an example of a work machine to which the concept of the present disclosure is applicable.

The hydraulic excavator comprises a vehicular body 1 and work implement 2. Vehicular body 1 has a swing unit 3, an operator's cab 4, and a travelling apparatus 5.

Swing unit 3 is disposed on traveling apparatus 5. Traveling apparatus 5 supports swing unit 3. Swing unit 3 can swing about a swing axis AX. An operator's seat 4S on which an operator is seated is provided in cab 4. The operator manipulates the hydraulic excavator in operator's cab 4. Traveling apparatus 5 has a pair of crawler belts 5Cr. The hydraulic excavator travels as crawler belts 5Cr rotate. Note that travelling apparatus 5 may be composed of vehicular wheels (or tires).

In an embodiment, a positional relationship of each component will be described with reference to an operator seated on operator's seat 4S. A frontward/rearward direction is a direction frontwardly/rearwardly of the operator seated on operator's seat 4S. A rightward/leftward direction is a rightward/leftward direction with respect to the operator seated on operator's seat 4S. The rightward/leftward direction matches the vehicle's widthwise direction (a vehicular widthwise direction). When the operator is seated on operator's seat 4S and faces frontward, the operator faces in the frontward direction, and a direction opposite to the frontward direction is the rearward direction. When the operator is seated on operator's seat 4S and faces frontward, a direction on a right side of the operator is referred to as the rightward direction, and a direction on a left side of the operator is referred to as the leftward direction.

Swing unit 3 has an engine compartment 9 in which an engine is housed, and a counter weight provided at a rear portion of swing unit 3. Swing unit 3 is provided with a handrail 19 frontwardly of engine compartment 9. The engine, a hydraulic pump, etc. are disposed in engine compartment 9.

Work implement 2 is supported by swing unit 3. Work implement 2 has a boom 6, a dipper stick 7, a bucket 8, a boom cylinder 10, a dipper stick cylinder 11, and a bucket cylinder 12.

Boom 6 is connected to swing unit 3 via a boom pin 13. Dipper stick 7 is connected to boom 6 via a dipper stick pin 14. Bucket 8 is connected to dipper stick 7 via a bucket pin 15. Boom cylinder 10 drives boom 6. Dipper stick cylinder 11 drives dipper stick 7. Bucket cylinder 12 drives bucket 8. Boom 6 has a proximal end (or a boom foot) connected to swing unit 3. Boom 6 has a distal end (or a boom top) connected to a proximal end of dipper stick 7 (or a dipper stick foot). Dipper stick 7 has a distal end (or a dipper stick top) connected to a proximal end of bucket 8. Boom cylinder 10, dipper stick cylinder 11, and bucket cylinder 12 are each a hydraulic cylinder driven with hydraulic oil.

Boom 6 is rotatable with respect to swing unit 3 about boom pin 13 serving as a central axis. Dipper stick 7 is rotatable with respect to boom 6 about dipper stick pin 14 serving as a central axis parallel to boom pin 13. Bucket 8 is rotatable with respect to dipper stick 7 about bucket pin 15 serving as a central axis parallel to boom pin 13 and dipper stick pin 14.

Note that bucket 8 and work implement 2 are examples of the presently disclosed "bucket" and "work implement."

[Configuration of Control System]

Figure 2:
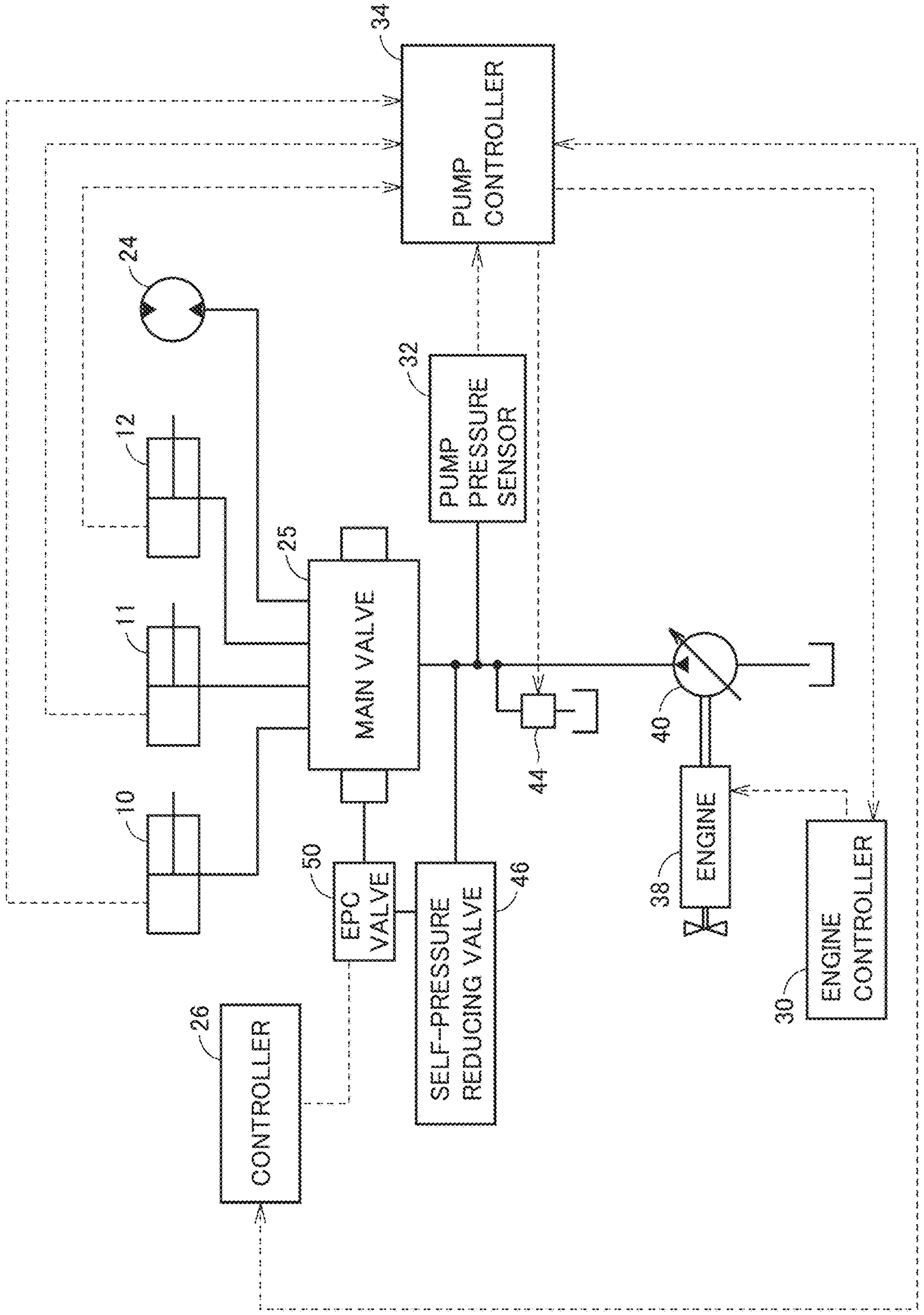
FIG. 2 is a diagram for illustrating a configuration of a control system for work machine 100 according to an embodiment.

FIG. 2 is a diagram for illustrating a configuration of a control system for work machine 100 according to an embodiment.

Referring to FIG. 2, work machine 100 includes a boom cylinder 10, a dipper stick cylinder 11, a bucket cylinder 12, a swing motor 24, a controller 26, an engine controller 30, an engine 38, a hydraulic pump 40, a main valve 25, a relief valve 44, a pump pressure sensor 32, a pump controller 34, a self-pressure reducing valve 46, and an EPC valve 50.

Engine 38 is, for example, a diesel engine, and is controlled by engine controller 30. Specifically, engine controller 30 controls engine 38 in output torque and rotational speed by controlling an amount of fuel injected from a fuel injection device (not shown).

Hydraulic pump 40 is driven by engine 38 to discharge hydraulic oil. Hydraulic pump 40 is a hydraulic pump of a fixed displacement type that changes an amount of hydraulic oil discharged depending on the rotational speed of engine 38. While in this example will be described a configuration using a single hydraulic pump 40, this is not exclusive, and a configuration using a plurality of hydraulic pumps can also be used.

Main valve 25 receives the hydraulic oil supplied from hydraulic pump 40, and distributes and thus supplies the hydraulic oil to boom cylinder 10, dipper stick cylinder 11, bucket cylinder 12, and swing motor 24.

Controller 26 outputs a command current to EPC valve 50. EPC valve 50 controls main valve 25 in accordance with the command current received from controller 26.

Controller 26 according to the embodiment includes a CPU (Central Processing Unit), a memory, and the like, and controls work implement 2 by executing a control program stored in the memory. As an example, the memory stores a control program for automatically controlling work implement 2 to execute a plurality of work steps. More specifically, the plurality of work steps include an excavation step of performing an excavating operation using work implement 2 with respect to a work topography, a swing step of swinging by swing unit 3, and a soil ejecting step of performing a soil ejecting operation using work implement 2 with respect to an excavated object carried in bucket 8 by the excavating operation.

Controller 26 holds state data indicating each of the plurality of work steps of the automatic control in the memory, and outputs the state data to pump controller 34. As an example, controller 26 holds at least one of automatic excavation state data, automatic swing state data, and automatic soil ejection state data, and outputs the state data to pump controller 34. Pump controller 34 can determine, for example, that the current state is the automatic excavation state based on the state data output from controller 26.

While in the present example controller 26 outputs state data, this is not exclusive, and pump controller 34 may access controller 26 and obtains state data stored in the memory.

The hydraulic oil output from hydraulic pump 40 is reduced to a fixed pressure by self-pressure reducing valve 46 and supplied for piloting.

Pump pressure sensor 32 detects the pressure of the hydraulic oil in a hydraulic circuit disposed between hydraulic pump 40 and main valve 25.

Relief valve 44 is connected to a hydraulic circuit having a channel between hydraulic pump 40 and main valve 25. When the hydraulic circuit is higher than a predetermined relief pressure, relief valve 44 opens to pass the hydraulic oil to a tank. Relief valve 44 can compensate for the pressure of the hydraulic oil flowing through the hydraulic circuit to be a predetermined pressure or less. Relief valve 44 is capable of changing the predetermined relief pressure to a first set pressure or a second set pressure higher than the first set pressure.

Pump controller 34 receives data of the pressure of the hydraulic oil in the hydraulic circuit as detected by pump pressure sensor 32. Pump controller 34 receives data of cylinder length from boom cylinder 10, dipper stick cylinder 11, and bucket cylinder 12. Pump controller 34 receives data from controller 26 regarding a state of the automatic control. Pump controller 34 adjusts the relief pressure of relief valve 44 based on the data of the pressure of the hydraulic oil in the hydraulic circuit as detected by pump pressure sensor 32, the data of cylinder length as received from boom cylinder 10, dipper stick cylinder 11 and bucket cylinder 12, and the data regarding the state of the automatic control.

Hydraulic pump 40, relief valve 44, boom cylinder 10, dipper stick cylinder 11, and bucket cylinder 12 are an example of the presently disclosed "hydraulic pump," "relief valve," and "hydraulic cylinder."

Figure 3:
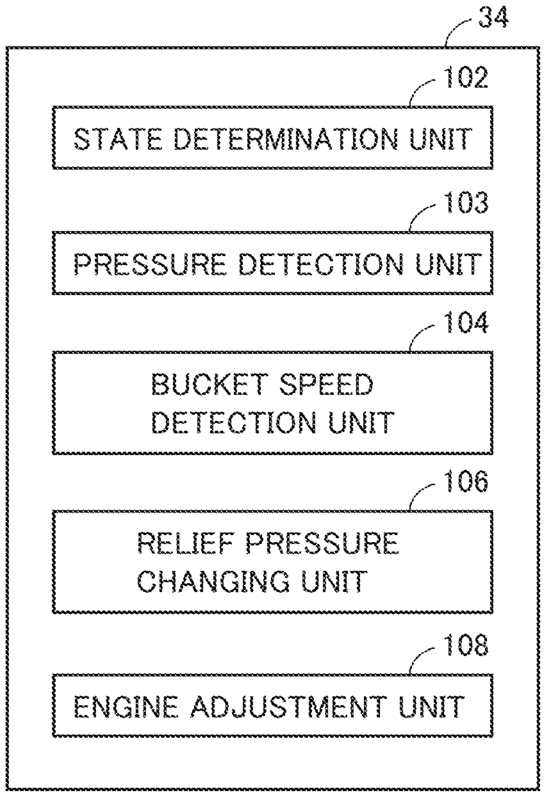
FIG. 3 is a functional block diagram of a pump controller 34 of work machine 100 according to an embodiment.

FIG. 3 is a functional block diagram of pump controller 34 of work machine 100 according to an embodiment.

As shown in FIG. 3, pump controller 34 includes a state determination unit 102, a pressure detection unit 103, a bucket speed detection unit 104, a relief pressure changing unit 106, and an engine adjustment unit 108.

State determination unit 102 receives data from controller 26 regarding a state of the automatic control and determines whether a controlled state of the work implement is an automatic excavation state.

Pressure detection unit 103 receives the data of the pressure of the hydraulic oil in the hydraulic circuit as detected by pump pressure sensor 32.

Bucket speed detection unit 104 receives cylinder length data from sensors provided at boom cylinder 10, dipper stick cylinder 11 and bucket cylinder 12, and detects the bucket's speed based on the cylinder length data.

Relief pressure changing unit 106 changes the relief pressure of relief valve 44 based on the pump pressure of the hydraulic circuit as received by pressure detection unit 103, the bucket's speed as detected by bucket speed detection unit 104, and the controlled state of the work implement as determined by state determination unit 102.

Relief valve 44 is preset to the first set pressure. When a predetermined condition is established, relief pressure changing unit 106 changes the relief pressure of relief valve 44 to the second set pressure higher than the first set pressure.

Engine adjustment unit 108 instructs engine controller 30 to adjust engine 38 in rotational speed.

State determination unit 102, pressure detection unit 103, bucket speed detection unit 104, relief pressure changing unit 106, and engine adjustment unit 108 are an example of the presently disclosed "state determination unit," "pressure detection unit," "speed detection unit," "relief pressure changing unit," and "engine adjustment unit."

<Control by Pump Controller>

Figure 4:
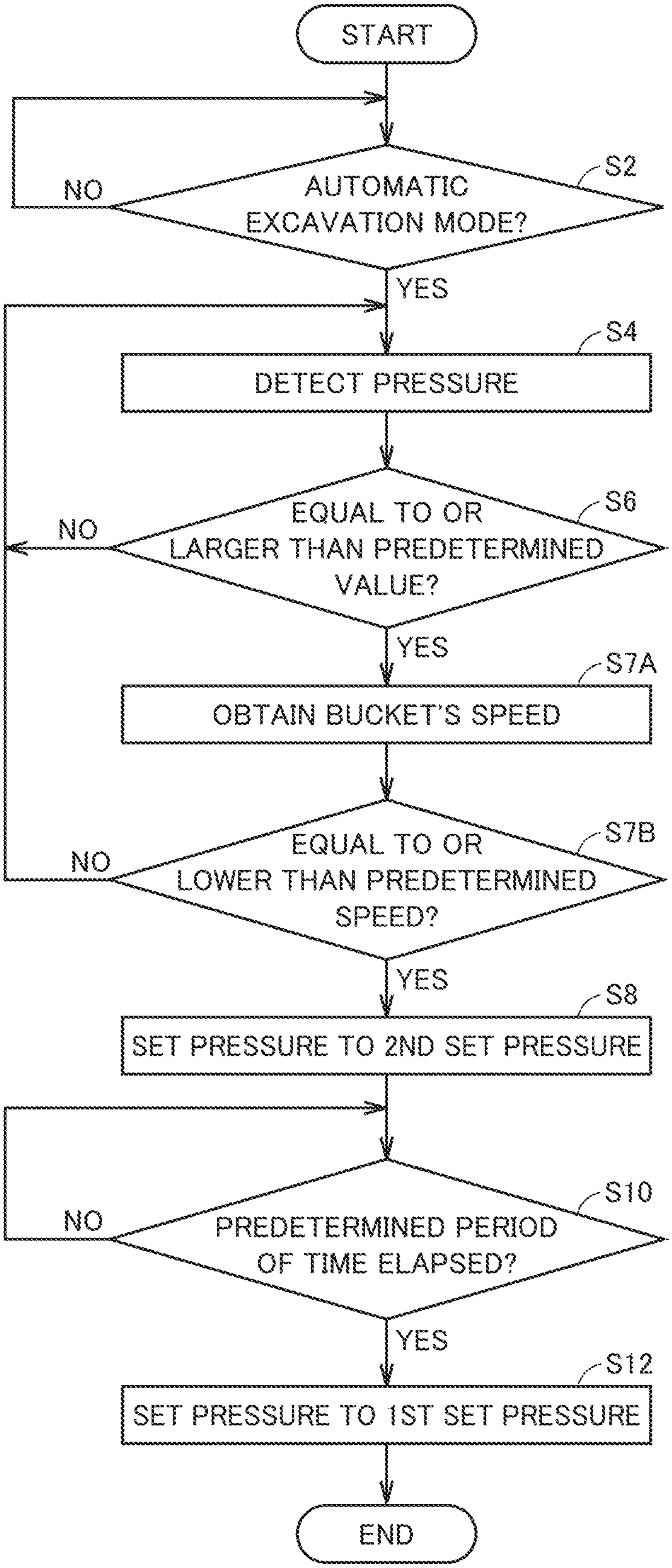
FIG. 4 is a flowchart of control by pump controller 34 according to an embodiment.

FIG. 4 is a flowchart of control by pump controller 34 according to an embodiment.

Referring to FIG. 4, pump controller 34 determines whether the current mode is an automatic excavation mode (step S2). Specifically, state determination unit 102 receives state data from controller 26 and determines whether the current mode is the automatic excavation mode.

In step S2, when pump controller 34 does not determine that the current mode is the automatic excavation mode (NO in step S2), pump controller 34 repeats determination in step S2.

When pump controller 34 determines in step S2 that the current mode is the automatic excavation mode (YES in step S2), pump controller 34 detects the pressure of the hydraulic oil (step S4). Specifically, pressure detection unit 103 obtains the pressure of the hydraulic oil as detected by pump pressure sensor 32. Pressure detection unit 103 may obtain the pressure of the hydraulic oil as detected by pressure sensors attached on the sides of the head and bottom of each of boom cylinder 10, dipper stick cylinder 11, and bucket cylinder 12.

Subsequently, pump controller 34 determines whether the obtained pressure is equal to or larger than a predetermined value (step S6). Specifically, relief pressure changing unit 106 determines whether the pressure of the hydraulic oil as obtained by pressure detection unit 103 is equal to or larger than the predetermined value. When it is determined that the pressure of the hydraulic oil detected by pump pressure sensor 32 is equal to or larger than the predetermined value, it can be determined that a work step with a large excavation load is performed.

When pump controller 34 determines in step S6 that the pressure of the hydraulic oil is equal to or larger than the predetermined value (YES in step S6), pump controller 34 obtains the bucket's speed (step S7A). Relief pressure changing unit 106 instructs bucket speed detection unit 104 to calculate the bucket's speed. Bucket speed detection unit 104 calculates the speed of bucket 8 of work implement 2 based on data of cylinder length from boom cylinder 10, dipper stick cylinder 11, and bucket cylinder 12. Bucket speed detection unit 104 outputs the calculated speed of bucket 8 to relief pressure changing unit 106.

Subsequently, pump controller 34 determines whether the bucket's speed is equal to or lower than a predetermined speed (step S7B). Specifically, relief pressure changing unit 106 determines whether the bucket's speed output from bucket speed detection unit 104 is equal to or lower than the predetermined speed (for example of zero). When it is determined that the bucket's speed output from bucket speed detection unit 104 is equal to or lower than the predetermined speed, it can be determined that a work step with a large excavation load is performed.

When pump controller 34 determines in step S7B that the speed is equal to or lower than the predetermined speed (YES in step S7B), pump controller 34 sets the relief pressure to the second set pressure (step S8). Specifically, when it is determined that the bucket's speed output from bucket speed detection unit 104 is equal to or lower than the predetermined speed, relief pressure changing unit 106 changes the relief pressure of relief valve 44 to the second set pressure.

Subsequently, pump controller 34 determines whether a predetermined period of time has elapsed since the relief pressure was set to the second set pressure (step S10). Relief pressure changing unit 106 determines whether a predetermined period of time has elapsed since the relief pressure was set to the second set pressure.

In contrast, in step S10, when pump controller 34 determines that the predetermined period of time has not elapsed since the relief pressure was set to the second set pressure (NO in step S10), pump controller 34 repeats determination in step S10.

Subsequently, when pump controller 34 determines in step S10 that the predetermined period of time has elapsed since the relief pressure was set to the second set pressure (YES in step S10), pump controller 34 sets the relief pressure to the first set pressure (step S12). Then, the process ends (END). Specifically, when it is determined that the predetermined period of time has elapsed since the relief pressure was set to the second set pressure, relief pressure changing unit 106 changes the relief pressure of relief valve 44 to the first set pressure. This can alleviate a load imposed on the hydraulic circuit by maintaining the relief pressure at a high level for a long period of time.

When pump controller 34 determines in step S6 that the pressure of the hydraulic oil is not equal to or larger than the predetermined value (NO in step S6), pump controller 34 returns to step S4 and repeats the above-described process.

When pump controller 34 determines in step S7B that the bucket's speed is not equal to or lower than the predetermined speed (NO in step S7B), pump controller 34 returns to step S4 and repeats the above-described process.

In the embodiment, relief pressure changing unit 106 changes the relief pressure of relief valve 44 to the second set pressure higher than the first set pressure when the controlled state output from controller 26 is the automatic excavation mode, the pressure of the hydraulic oil in the hydraulic circuit is equal to or larger than the predetermined pressure, and the speed of bucket 8 is equal to or lower than the predetermined speed (for example, a stopped state).

Changing the relief pressure of relief valve 44 from the first set pressure to the second set pressure can increase the pressure of the hydraulic oil in the hydraulic circuit. Thus, output (or power) of work implement 2 connected to main valve 25 can be increased and operated when automatic excavation with a high excavation load is controlled.

Relief pressure changing unit 106 of the above-described embodiment changes the relief pressure of relief valve 44 to the second set pressure higher than the first set pressure when a predetermined condition is established, that is, when the automatic excavation mode is executed, the pressure of the hydraulic oil in the hydraulic circuit is equal to or larger than a predetermined pressure, and the speed of bucket 8 is equal to or lower than a predetermined speed. This is not exclusive, however, and relief pressure changing unit 106 may change the relief pressure of relief valve 44 in the automatic excavation mode based on at least one of the pressure of the hydraulic oil in the hydraulic circuit and the speed of bucket 8. More specifically, relief pressure changing unit 106 may change the relief pressure of relief valve 44 to the second set pressure higher than the first set pressure when the automatic excavation mode is executed, and the pressure of the hydraulic oil in the hydraulic circuit is equal to or larger than the predetermined pressure and/or the speed of bucket 8 is equal to or lower than the predetermined speed.

In the above example, relief pressure changing unit 106 changes the relief pressure of relief valve 44 to the first set pressure when it is determined that the relief pressure is set as the second set pressure for a predetermined period of time.

In contrast, when the excavation load is reduced, the relief pressure of relief valve 44 may be changed to the first set pressure.

For example, when the speed of the work implement is recovered, the relief pressure of relief valve 44 may be changed to the first set pressure. Specifically, relief pressure changing unit 106 may change the relief pressure of relief valve 44 to the first set pressure when the speed of bucket 8 exceeds the predetermined speed. Alternatively, relief pressure changing unit 106 may change the relief pressure of relief valve 44 to the first set pressure when the pressure of the hydraulic oil in the hydraulic circuit falls below the predetermined pressure.

When it is determined that the excavation state ends, relief pressure changing unit 106 may change the relief pressure of relief valve 44 to the first set pressure. For example, relief pressure changing unit 106 may change the relief pressure of relief valve 44 to the first set pressure when it is determined, based on data received from controller 26 regarding the state of the automatic control, that the excavation state ends and an operation is shifted to a swing state. Alternatively, the relief pressure of relief valve 44 may be changed to the first set pressure when it is determined using a visual sensor that the teeth of bucket 8 have come out of the ground as it is deemed that the excavation state has ended. More specifically, relief pressure changing unit 106 may change the relief pressure of relief valve 44 to the first set pressure when it is determined using a visual sensor that the teeth of bucket 8 exceeds the current topographical level. Alternatively, the relief pressure of relief valve 44 may be changed to the first set pressure when it is determined that the excavation state ends based on the posture of the work implement. More specifically, relief pressure changing unit 106 may change the relief pressure of relief valve 44 to the first set pressure when it is determined, based on data of cylinder length from boom cylinder 10, dipper stick cylinder 11, and bucket cylinder 12, that bucket 8 is in a posture carrying the soil inside bucket 8.

MODIFIED EXAMPLE 1

There is a possibility that in the automatic excavation mode the vehicle may collide with an obstacle (e.g., a rock or the like) and the speed of bucket 8 is instantaneously zeroed or the pressure of the hydraulic oil reaches the predetermined value or larger. In that case, relief pressure changing unit 106 may change the relief pressure of relief valve 44 to the second set pressure higher than the first set pressure.

In a first modified example, a method for preventing such an erroneous operation will be described. More specifically, in order to prevent the erroneous operation, relief pressure changing unit 106 adds as a condition whether a state with a high excavation load continues for a predetermined period of time.

For example, relief pressure changing unit 106 may change the relief pressure of relief valve 44 to the second set pressure higher than the first set pressure when a predetermined condition is established, that is, when the automatic excavation mode is executed, the pressure of the hydraulic oil in the hydraulic circuit continues to be equal to or larger than a predetermined value for a predetermined period of time, and the speed of bucket 8 continues to be equal to or lower than a predetermined speed for a predetermined period of time.

As another method, a decision may be made by using a measurement value after a process using a filter circuit for a moving average is performed.

Specifically, pressure detection unit 103 may be provided with a filter circuit to perform a process for a moving average and a measurement value after passing through the filter circuit may be output to relief pressure changing unit 106. Alternatively, bucket speed detection unit 104 may be provided with a filter circuit to perform a process for a moving average and a calculated value after passing through the filter circuit may be output to relief pressure changing unit 106.

The processing based on the first modified example of the embodiment can remove sudden disturbance and prevent erroneous operation.

While in the present example a condition has been described for changing the relief pressure of relief valve 44 from the first set pressure to the second set pressure, it is similarly applicable to changing the relief pressure of relief valve 44 from the second set pressure to the first set pressure.

MODIFIED EXAMPLE 2

In the above-described embodiment, when automatic excavation with a high excavation load is controlled, the relief pressure of relief valve 44 is changed from the first set pressure to the second set pressure to increase the pressure of the hydraulic oil in the hydraulic circuit to increase an output (or power) of work implement 2. In this regard, relief pressure changing unit 106 changes the relief pressure of relief valve 44 to the second set pressure higher than the first set pressure, and instructs engine adjustment unit 108 to adjust the engine's speed.

Figure 5:
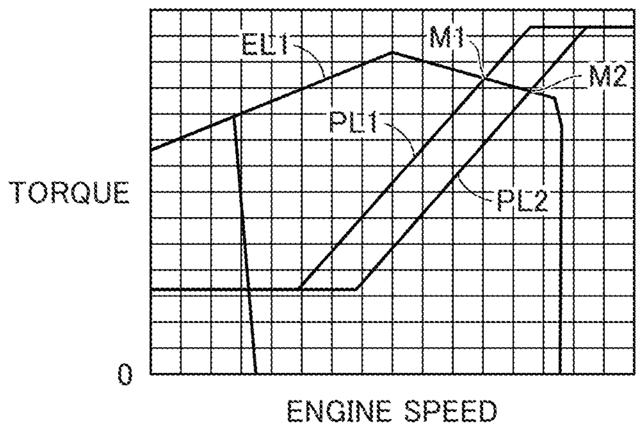
FIG. 5 represents a relationship between pump absorbed torque and engine speed according to an embodiment.

FIG. 5 represents a relationship between pump absorbed torque and engine speed according to an embodiment.

As shown in FIG. 5, an engine output characteristic line EL1 of engine 38 is shown. EPC valve 50 is controlled so that pump absorbed torque matches engine output torque at a matching point based on engine output characteristic line EL1 and a pump absorbed torque characteristic line PL. In the present example, a pump absorbed torque characteristic line PL1 and a pump absorbed torque characteristic line PL2 are provided, and normally, control is applied so that a match is done at a matching point M1 of pump absorbed torque characteristic line PL1 and engine output characteristic line EL1. When automatic excavation with high excavation load is controlled, pump absorbed torque characteristic line PL1 is changed to pump absorbed torque characteristic line PL2. Thus, control is applied so that a match is done at a matching point M2 of pump absorbed torque characteristic line PL2 and an engine output characteristic line EL1. Specifically, engine adjustment unit 108 instructs engine controller 30 to increase the engine's speed.

In the second modified example of the embodiment, when automatic excavation with a high excavation load is controlled, the relief pressure of relief valve 44 can be changed from the first set pressure to the second set pressure to increase the pressure of the hydraulic oil in the hydraulic circuit, and the engine's speed can be increased to further increase an output (or power) of work implement 2.

While in the above-described embodiment a system has been described to increase an output of work implement 2 mainly when automatic excavation is controlled, this is not exclusive, and it is also applicable to controlling normal excavation. More specifically, the flowchart described with reference to FIG. 4 may be executed when it is determined that the current state is the excavation state based on data received from controller 26 regarding a controlled state. For example, instead of determining in step S2 whether the current mode is the automatic excavation mode, whether the current state is the excavation state may be determined, and if so, the FIG. 4 flowchart after step S2 et. seq. may be executed. Alternatively, when it is determined using a visual sensor that the teeth of bucket 8 have entered the ground, it may be determined that the current state is the excavation state, and the FIG. 4 flowchart after step S2 et. seq. may be executed. Alternatively, when it is determined that the current state is the excavation state based on the posture of the work implement, the FIG. 4 flowchart after step S2 et. seq. may be executed.

While in the above embodiment has been described a system in which bucket speed detection unit 104 calculates the speed of bucket 8 of work implement 2 based on data of cylinder length obtained from boom cylinder 10, dipper stick cylinder 11 and bucket cylinder 12, this is not exclusive, and the speed of bucket 8 may be detected using an IMU (inertial measurement unit).

A visual sensor (a lidar, a stereo-camera, or the like) attached to a front surface of cab 4 may be used to obtain and use a feature value of bucket 8 to detect the speed of bucket 8. Alternatively, a marker may be attached to bucket 8 and the speed of bucket 8 may be detected based on the movement of the marker.

While a hydraulic excavator has been described as one example of a work machine in the above embodiment, the work machine is not limited to a hydraulic excavator, and it may be a crawler dozer, a wheel loader and other similar work machines.

While an embodiment of the present disclosure has been described, it should be understood that the presently disclosed embodiment is illustrative and non-restrictive in any respect. The scope of the present disclosure is defined by the terms of the claims, and is intended to include any modifications within the meaning and scope equivalent to the terms of the claims.

REFERENCE SIGNS LIST

1 vehicular body, 2 work implement, 3 swing unit, 4 cab, 4S driver's seat, 5 traveling apparatus, 5Cr crawler belt, 6 boom, 7 dipper stick, 8 bucket, 8A teeth, 9 engine compartment, 10 boom cylinder, 11 dipper stick cylinder, 12 bucket cylinder, 13 boom pin, 14 dipper stick pin, 15 bucket pin, 19 handrail, 21 antenna, 21A first antenna, 21B second antenna, 26 controller, 30 engine controller, 32 pump pressure sensor, 38 engine, 40 hydraulic pump, 44 relief valve, 46 self-pressure reducing valve, 50 EPC valve.

The invention claimed is:

1. A work machine comprising:
- a work implement;
- a hydraulic cylinder that operates the work implement by hydraulic oil;
- a hydraulic pump that supplies the hydraulic oil to the hydraulic cylinder via a hydraulic circuit;
- a relief valve that can set a relief pressure of the hydraulic circuit to either a first set pressure or a second set pressure higher than the first set pressure;
- a state determination unit that determines whether a controlled state of the work implement is an excavation state;
- a detection unit that detects at least one of a pressure of the hydraulic oil in the hydraulic circuit and a speed of the work implement; and
- a relief pressure changing unit that changes a relief pressure of the relief valve from the first set pressure to the second set pressure based on a detection value of at least one of the pressure of the hydraulic oil in the hydraulic circuit and the speed of the work implement when the controlled state of the work implement is the excavation state.

2. The work machine according to claim 1, wherein the detection unit includes a pressure detection unit that detects the pressure of the hydraulic oil in the hydraulic circuit.

3. The work machine according to claim 2, the hydraulic pump being driven by an engine, the work machine further comprising an engine adjustment unit that increases a rotational speed of the engine when the pressure of the hydraulic oil detected by the pressure detection unit is larger than a predetermined value.

4. The work machine according to claim 1, further comprising a speed detection unit that detects the speed of the work implement.

5. The work machine according to claim 1, wherein when the relief pressure of the relief valve is changed to the second set pressure and thereafter a predetermined period of time elapses the relief pressure changing unit changes the relief pressure of the relief valve to the first set pressure.

6. The work machine according to claim 1, wherein
- the work implement has a bucket, and
- when the relief pressure of the relief valve is changed to the second set pressure, and thereafter the pressure of the hydraulic oil in the hydraulic circuit has a value less than a predetermined value and/or a speed of the bucket is larger than a predetermined speed, the relief pressure changing unit changes the relief pressure of the relief valve to the first set pressure.

7. The work machine according to claim 6, wherein when the relief pressure of the relief valve is changed to the second set pressure, and thereafter the pressure of the hydraulic oil in the hydraulic circuit continues to have a value less than a predetermined value for a predetermined period of time or longer and the speed of the bucket also continues to be larger than a predetermined speed for the predetermined period of time or longer, the relief pressure changing unit changes the relief pressure of the relief valve to the first set pressure.

8. The work machine according to claim 1, wherein when the relief pressure of the relief valve is changed to the second set pressure and thereafter the controlled state of the work implement is not the excavation state the relief pressure changing unit changes the relief pressure of the relief valve to the first set pressure.

9. The work machine according to claim 1, wherein
the work implement has a bucket, and
when the controlled state of the work implement is the excavation state, and the pressure of the hydraulic oil in the hydraulic circuit has a predetermined value or more and/or a speed of the bucket is a predetermined speed or less, the relief pressure changing unit changes the relief pressure of the relief valve from the first set pressure to the second set pressure.

10. The work machine according to claim 1, wherein
the work implement has a bucket, and
when the controlled state of the work implement is the excavation state, and the pressure of the hydraulic oil in the hydraulic circuit has a predetermined value or more for a predetermined period of time and/or a speed of the bucket is a predetermined speed or less for a predetermined period of time, the relief pressure changing unit changes the relief pressure of the relief valve from the first set pressure to the second set pressure.

11. The work machine according to claim 1, wherein the detection unit includes a filter circuit that processes the detection value of the at least one of the pressure of the hydraulic oil in the hydraulic circuit and the speed of the work implement to obtain a moving average thereof and outputs the moving average.

12. The work machine according to claim 1, wherein the controlled state of the work implement is an automatic excavation state.

13. A method for controlling a work machine, comprising:
determining whether a controlled state of a work implement is an excavation state;
detecting at least one of a pressure of hydraulic oil supplied via a hydraulic circuit to a hydraulic cylinder causing the work implement to operate and a speed of the work implement when the controlled state of the work implement is the excavation state; and
changing a relief pressure of a relief valve of the hydraulic circuit from a first set pressure to a second set pressure higher than the first set pressure based on a detection value of at least one of the pressure of the hydraulic oil in the hydraulic circuit and the speed of the work implement.

* * * * *